Patented Mar. 23, 1926.

1,577,499

UNITED STATES PATENT OFFICE.

JAMES H. STEDMAN, OF BRAINTREE, MASSACHUSETTS.

WALL COVERING AND PROCESS OF MAKING THE SAME.

No Drawing.   Application filed September 7, 1922.   Serial No. 586,786.

*To all whom it may concern:*

Be it known that I, JAMES H. STEDMAN, a citizen of the United States, residing at Braintree, in the county of Norfolk and State of Massachusetts, have invented certain new and useful Improvements in Wall Coverings and Processes of Making the Same, of which the following is a specification.
This invention relates to the process of making sheet material comprising rubber having a contained mass of cotton thread or the like, in an unshredded condition and to the article produced by practising the process.

One proposed use of the sheet material is for wall coverings and an object of the invention is to produce a wall covering that is attractive in appearance, not subject to fracture or other marring, and exceedingly durable, giving long life and wear. A further object of the invention is to produce a rubber sheet of the character described in an economic manner and yet retain its maximum of strength. Another important object is to produce a covering material that is perfectly sanitary. It will be understood from the following description that the article produced by practising the process is not limited to use as a wall covering but may be used in other environments and for other purposes.

The nature of the novel method will be indicated, for illustrative purposes, by a description of its practice in manufacturing relatively large sheets for use as wall coverings, and its true scope will then be particularly pointed out in the appended claims.

In practising the process, accumulations of rubber stock, such as uncured friction scrap or breaker strip, are fed to a cracker which kneads and mixes the masses of rubber and thread reinforcement, as they pass through the cracker, into rough sheet form.
The friction scrap to be used may be the waste from tire manufacture, both cord and fabric, and may include also the waste from hose, belting and other rubber goods. Any skim-coated fabric may be employed or cloth insertion, either cured or uncured. The tire friction scrap is preferred and the original admixture contains friction from both cord and fabric tires. In the appended claims the rubber base of the mixture used, whatever its nature, will be referred to simply as "rubber." Experience has shown that the surface markings on the sheet finally produced are extremely satisfactory if substantially fifty per cent of each kind of scrap is used initially, but this may be varied within broad limits, or a single kind of friction scrap may be used. Friction scrap from cord tires contains cotton fibre in the form of individual threads laid side by side, while friction scrap from fabric tires contains cotton fibre in the form of a woven cloth. As will presently be explained the relative percentage of each, where thread in more than one form is used is instrumental in determining the nature of the surface effect finally obtained. At the cracker care is taken not to pass the stock through for a long enough period to reduce the contained reinforcing thread to a tissue or to break it down into minute shreds. The first mixing step at the cracker is highly important and the sheet is removed just as soon as the reinforcement has been thoroughly mixed throughout the body of the material. The cracker may reduce the thread by cutting it into shorter lengths, and smaller pieces if woven, by a gross tearing or flattening of the mass but the individual threads are not materially flattened, this step of the process having the effect of pressing the reduced thread into the body material. The action on the threads might be expressed broadly by saying that while their length and position is altered, their original size, i. e. area of their cross-section or gage is unaltered.

The sheet delivered from the cracker is then taken to a calender. The calendering reduces the thickness of the sheet to whatever thickness may be prescribed as desirable and places further pressure on the threads compacting them into the base material but still not flattening them unduly, or at all, so that they still retain substantially their original cross-sectional area or shape. The first passage through the calender tends to draw the threads out in the direction of the length of the sheet and, to counteract this, on the next passage through the calender and such additional passages as may be deemed desirable, the sheet is first doubled, enfolded and crushed with the hands into a crumpled mass and then fed to the rolls. This destroys the continuity of direction of the threads in the mass and thoroughly mixes and tangles them together.

Since the threads extend throughout the mass they show on both sides of the sheet after the calendering is completed but are firmly embedded and impregnated therein.

The appearance of the surface thus produced is difficult to describe but it may be said to closely approximate grass cloth since the surface is composed of a substantial covering of the unshredded thread comprising an irregular mass of thread the elements of which extend in a multitude of directions presenting a gnarled effect to the eye and yet there may be a distinct trend of direction lengthwise of the sheet according to the final effect of the manipulation at the calender. While the thread from the cord tire friction is bent and twisted and commingled, it assumes a general longitudinal location, but the thread from the fabric tire friction is so tangled that it presents blurs or irregular masses distributed indiscriminately over the surface and it also may be intermixed and tangled with the thread from the cord tire friction. By varying the proportion of either kind of friction the surface appearance of the final sheet is accordingly altered permitting one or the other of the characteristics just described to predominate. Excellent surface effects have been obtained by a mixture of rubber and fibre in the proportion one to one, but this may be varied, without departing from the invention, by reducing the fibre content to as low as one-half the rubber, or by raising it to twice the amount of rubber. It should be understood, however, that these limits are not fixed and are only stated generally. Exceedingly attractive effects can be produced in this way it being understood that the thread, in its original state as hereinbefore described, is distinctly visible, that is, the original thread has not been substantially disintegrated by shredding or comminution, nor is it forced below the surface sufficiently to conceal it from view.

After calendering to a thin sheet a backing of woven material may be applied when an extremely flexible covering is desired, or for a floor covering the sheet may be backed with a thick sheet of rubber or other suitable material to make it stiff enough for tiling. The sheets of indefinite length delivered from the calender may be cut to any desired size or shape. Also the sheets may be vulcanized, but it is contemplated that the covering material may be used in either an uncured or cured state according to the effect desired, and the conditions of use. Experience has determined that it is desirable, at times, to add coloring to the material, in such quantity as may be required, in order to change the tone or color of the base material and obtain new effects. This step may be performed either at the cracker or at the calender with excellent results. It may also be found desirable to increase the percentage of fibre in the mass and this may be accomplished by adding cotton threads, in the proportion required, at the cracker.

As a result of practising the process hereinbefore described a sheet is obtained making a highly efficient covering for walls and for other purposes. It will be observed that the article is produced as a monolith and can be employed to cover large spaces without the necessity of joints. It is thus easily cleaned and, having no cracks, dirt finds no lodgement thereon. This is important where the covering is used in hospitals and the like. Since it is fracture proof it is forever immune from cracks or other breaks which would render replacement necessary. It is thus immensely superior to marble, wood, plaster or plaster substitutes. Marble is expensive, greasy in appearance and fractures easily. Wood shrinks and swells with weather conditions and requires constant painting as a preservative. Plaster and the like is subject to fracture and must be painted for appearance. The covering herein described is economic of manufacture since the enormous cost of reducing the fibre to a tissue is wholly saved, and at the same time the material ultimately produced gains substance, strength and beauty due to leaving the fibre in its original form.

It will be understood from the foregoing description that the essential feature is the admixture of fibre, such as cotton yarn either woven or unwoven, with a base of rubber. While tire friction is utilized by preference, because it furnishes the fibre in substantially the desired proportions, the practice of the invention is not confined to a use of this material. As hereinbefore stated it is found desirable, under certain conditions, to increase the fibre content of the friction and those skilled in the art will recognize that a mechanical mixture may be made from crude or reclaimed rubber and fibre, closely simulating the friction, the proportional values of the ingredients being in accordance with any preselected formula. Accordingly, it is within the scope of the invention to employ not only uncured friction scrap but any compound like it, or having the same general characteristics, as defined by the appended claims.

I believe that I am the first to produce sheet rubber having the characteristics described which may serve for many uses, and the nature and scope of the invention having been indicated, and the preferred manner of practising the method having been specifically described, what is claimed as new, is:—

1. The process of manufacturing flexible sheets which comprises reducing by a gross tearing a mixture of rubber and cotton threads, or the like, to a sheet in a manner which preserves the original cross-sectional area of the threads and also leaves them in a tangled condition as distinguished from lying substantially all in one direction, the thread being present in such quantity that it substantially covers both surfaces of the sheet, and then completing the production of the sheet by calendering.

2. The process of manufacturing flexible sheets which comprises reducing in a cracker a mixture of rubber and cotton thread, or the like, to a sheet by a gross tearing and flattening of the mixture, which flattens the mass but not the individual threads, the unshredded thread being present in such quantity as to impregnate the flattened mass from surface to surface thereof and to appear as the major portion of said surfaces, and then calendering the flattened mass to the required thickness without causing the threads to form a perfect grain by lying in one direction only and thus materially increase the tensile strength in that direction.

3. The process of manufacturing flexible sheets which comprises working, by a gross tearing, accumulations of rubber scrap containing cotton thread, or the like, into a flattened mass throughout which the reduced thread has been pressed in an unshredded state, reducing the thickness of said flattened mass by calendering, and then recalendering it one or more times, but first enfolding and doubling the sheet into a crumpled mass.

4. The process of manufacturing flexible sheets which comprises working, by a gross tearing, accumulations of rubber scrap containing cotton thread, or the like, into a flattened mass throughout which the reduced thread has been pressed in an unshredded state, reducing the thickness of said flattened mass by calendering, and then recalendering it one or more times by successively feeding the material to the calender rolls in a manner to vary the direction in which the thread has been pulled by the preceding operation.

5. The process of manufacturing flexible sheets which comprises working, by a gross tearing, accumulations of rubber scrap containing cotton thread or the like, into a flattened mass throughout which the reduced thread has been pressed in an unshredded state, reducing the thickness of said flattened mass by calendering, and then recalendering it one or more times, but first manipulating the material between each operation in a manner to prevent a perfect parallel relationship of the threads.

6. The process of manufacturing flexible sheets which comprises working, by a gross tearing, a mixture of uncured cord and fabric tire friction scrap into a flattened mass leaving the thread torn but unshredded and thoroughly impregnated in the mass, reducing the thickness of said flattened mass by calendering, and then recalendering it one or more times, but first enfolding and doubling the sheet into a crumpled mass.

7. The process of manufacturing flexible sheets which comprises working, by a gross tearing, a mixture comprising substantially equal parts of uncured cord and fabric tire friction scrap into a flattened mass leaving the threads torn but unshredded and thoroughly impregnated in the mass, reducing the thickness of said flattened mass by calendering, and then recalendering one or more times, but first enfolding and doubling the sheet into a crumpled mass.

8. The process of manufacturing flexible sheets which comprises working, by a gross tearing, accumulations of rubber scrap containing cotton thread or the like, into a flattened mass throughout which the reduced thread has been pressed in an unshredded state, reducing the thickness of said flattened mass by calendering, and then recalendering one or more times, but first enfolding and doubling the sheet into a crumpled mass, coloring material being added in the proportion desired either while flattening or calendering the mass.

9. The process of manufacturing flexible sheets which comprises working, by a gross tearing, accumulations of rubber scrap containing cotton thread or the like, into a flattened mass throughout which the reduced thread has been pressed in an unshredded state, reducing the thickness of said flattened mass by calendering, recalendering one or more times, but first enfolding and doubling the sheet into a crumpled mass, and then vulcanizing the sheet thus produced.

10. The process of manufacturing flexible sheets which comprises working, by a gross tearing, accumulations of rubber scrap containing cotton thread or the like, into a flattened mass throughout which the reduced thread has been pressed in an unshredded state, reducing the thickness of said flattened mass by calendering, recalendering one or more times, but first enfolding and doubling the sheet into a crumpled mass, applying a backing sheet to the calendered material, and finally curing the article thus produced.

11. As an article of manufacture a rubber sheet having contained cotton thread in an unshredded condition which substantially covers the surface in a thoroughly intertwined mass.

12. As an article of manufacture a flexible sheet that is equally pliable to bending in all directions characterized by a base of rubber that is impregnated from surface to surface with tangled lengths of unshredded cotton thread, which protrudes from the rubber base on each surface of the sheet.

13. An article of the nature described characterized by a mixture of rubber and tangled lengths of unshredded cotton thread the thread predominating in appearance, substantially obscuring the rubber and presenting a rough uneven surface having the effect of grass-cloth.

14. A vulcanized rubber sheet of the character described having its surface substantially covered with partially embedded cotton thread, or the like, in both individual strands and fabricated pieces all of which is preserved in substantially its original state.

15. As an article of manufacture a rubber sheet having contained cotton threads in both individual strands and fabricated pieces, the threads being unshredded but twisted and commingled throughout the thickness of the sheet and being present in sufficient quantity to give a gnarled appearance to its surface.

16. As an article of manufacture a rubber sheet having contained cotton thread from both cord and fabric tire friction scrap which has been reduced in length but not in cross-sectional area, the cord thread showing on the surface in a twisted and tangled condition and the fabricated thread showing in the form of blurs.

JAMES H. STEDMAN.